United States Patent Office 2,775,123
Patented Dec. 25, 1956

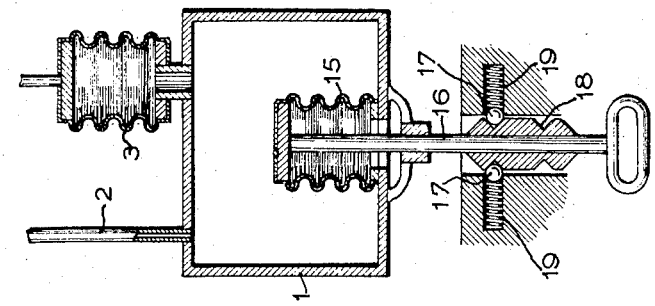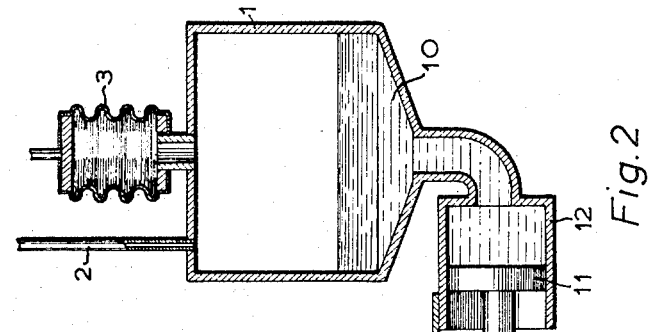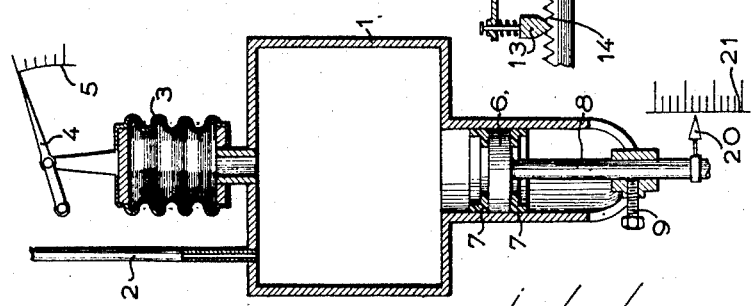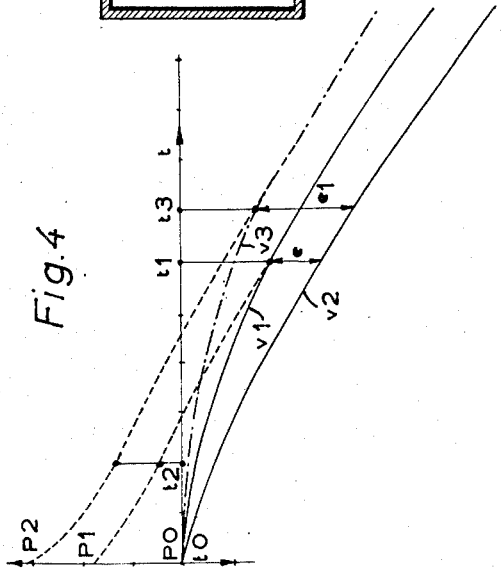

2,775,123
RATE OF CLIMB INDICATOR

René Salle, Marly le Roi, Paul Etienne Sévin, Clamart, and Jean Olivier Mottais, St. Nazaire, France, assignors to Societe Nationale de Constructions Aeronautiques du Sud-Ouest (S. N. C. A. S. O.), Paris, France, a company of France Application July 29, 1953, Serial No. 371,004

Claims priority, application France August 1, 1952

3 Claims. (Cl. 73—179)

This invention relates to devices comprising a movable member, the position of which is a function of the value of the rate of a variation of pressure in an outer space. Such a device will be called hereunder a "cariometer," whatever may be the function of its movable member and the latter will be called "an index," even if it is used otherwise than for indicating purposes, it being well understood that the invention is in no way limited to the use of said device as a metering apparatus, the above-mentioned movable member being easily adapted to be used, e. g. for controlling, regulating, switching functions or the like.

It may be noted also that a particularly interesting scope of application of said devices is the measure of the rate of climb of aerodynes, the control of the inner pressure of a cockpit or pressurization, the guiding in altitude of airplanes, etc.

The invention relates more particularly to variometers of the type comprising a closed vessel communicating through a capillary tube with an outer space and a differential pressure-responsive device, such as an aneroid diaphragm-case having its inner space in permanent communication with said vessel and its outer wall exposed to the pressure in said outer space, the deformation of said diaphram-case being used to position the index of the variometer.

The operation of such a variometer is based on the fact that when the pressure in the outer space is varied, the pressure in the vessel also undergoes a variation but always with a certain pressure difference due to the loss of pressure through the capillary tube. This is illustrated in Fig. 4 of the accompanying drawings which shows variations of pressure versus time. Let it be pointed out that these curves are purely explanatory and do not pretend to any mathematical accuracy. In this diagram, curve $V_1$ shows an example of a pressure variation in the closed vessel of a variometer, in response to a variation $V_2$ of the outer pressure.

Now, when $V_2$ varies at a constant rate, the pressure difference $e$ between $V_2$ and $V_1$ also remains substantially constant, so that the position of the index of the variometer which is determined by the deformation of the diaphragm-case, that is in turn a function of the value of the shifting or pressure difference $e$, gives an indication of said rate of variation.

Unfortunately, as shown in the diagram, the difference between pressures $V_1$ and $V_2$ assumes only its steady value $e$, at a certain time $t_1$ after the origin $t_0$ of the variation of the outer pressure $V_2$, so that a correct indication of the rate of variation $V_2$ is obtained only at the end of a transient period $t_0$—$t_1$ which is often of comparatively long duration. This is due to a number of phenomena inherent with the very nature of such a variometer.

First of all, a certain time is required for building-up through the capillary tube from pressure equilibrium the constant rate of flow corresponding to the steady value $e$ of the pressure shifting. This "inertia" of the capillary tube depends upon the length and cross-section of the capillary tube. A second type of phenomena which extends the duration of the transient period is due to temperature influences, such as the cooling effect due to the expansion of air in the closed vessel.

The "inertia" of the capillary tube may be obviously partially disposed of by reducing its length and/or increasing its cross-section. This is the solution which has been adopted in aircraft panel-variometers. However, it offers the drawback of reducing the value of the pressure differential for a given rate of variation of the outer pressure and, hence, the power available at the index, which is objectionable in controlling applications such as pressurization.

In order to attenuate the influence of the thermal phenomena, there have been proposed heretofore, a number of insulating arrangements such as the so-called Dewar flask. These devices, however, have the drawback of being exceedingly fragile, complicated and expensive.

The invention has for its purpose to reduce the transient period of a variometer by extremely simple means and hence at a very low cost without decreasing, and even while permitting a considerable increase of, the pressure difference and, hence, the actuating power available at the index.

With this purpose in view, the invention has for its main object to provide a variometer of the type described including movable control means to vary the capacity of its closed vessel, and locating means to hold said movable control means stationary when they are not operated. This arrangement permits, by operating said capacity varying means immediately prior to the use of the variometer, creating artifically a pressure difference to thereby reduce the transient period required for the establishment of the pressure difference in operation. It only implies that the expected variation is known, at least approximately.

Now, it is obvious that if the rate of variation of the outer pressure is more accurately known before hand, which is the case, e. g. when the variometer is intended to check the known rate of climb of an airplane or to control pressurization during a descent or a climb at a known rate, it will be possible to predetermine the optimum extent to which the capacity of the vessel is to be varied to reduce the duration of the transient period to a minimum.

Experiments have shown that the optimum value of the pressure variation to be imparted to the vessel of the variometer before use, is substantially equal to one and one-half times the expected pressure difference.

A more particular object of the invention is therefore to provide a variometer with variable capacity of the type described, further comprising means to control the extent to which its capacity is varied, said means preferably including an indicator associated with a scale graduated in terms of the rate of variation of the outer pressure.

In the diagram of Fig. 4, it may be seen easily that if the initial value of the pressure in the closed vessel is brought to $P_1$, instead of $P_0$, the transient period is reduced to $t_0$—$t_2$, instead of $t_0$—$t_1$.

A further advantage of the variometer according to the invention, is that the pressure difference may be considerably increased without increasing the duration of the transient period. This is illustrated in the dotted curve $V_3$ plotted in Fig. 4, which clearly shows that if the length of the capillary tube is so increased as to obtain a shifting $e_1$ consideraby greater than $e$, all other things being equal, it is possible to maintain the same duration $t_0$—$t_2$ of the transient period instead of $t_0$—$t_3$, by initially varying the capacity of the vessel to such an extent as to build-up in said vessel a suitable initial pressure $P_2$.

This advantage is particularly interesting in pressurization applications where the index is advantageously capable of physical controlling power. To illustrate the possibilities of a variometer according to the invention, it will be pointed out that, all other things being equal, it permits, for example, of providing a pressure difference of 10 g./cm.$^2$ instead of 1 g./cm.$^2$ with a similar conventional variometer. Similarly, to give an idea of the considerable reduction of the present period that may be obtained according to the invention, experiments have shown that, for a rate of climb of 3 m./sec., a conventional variometer of 1 litre capacity equipped with a 30 cm. long capillary tube, has a transient period of about 3 minutes, which may be reduced as far as to 15 seconds if the same variometer is provided with a vessel having a variable capacity. As a comparison, let it be added that if the same were provided with a Dewar flask of first grade, it would still require about 1 minute to reach its steady rate of operation.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Figs. 1 to 3 are diagrammatic sectional views of three embodiments of variometers according to the invention.

A closed vessel 1 communicates with an outer space only through a capillary tube 2. An aneroid diaphragm-case 3, the deformation of which detects the pressure difference between the inner space of the vessel 1 and the outer space has its outer wall exposed to the pressure in said outer space and its inner space communicating with vessel 1.

Fig. 1 shows a variometer in which the diaphragm-case 3 is operatively connected with an index 4 cooperating with a graduated scale 5. The position of index 4 indicates the rate of variation of the pressure in the outer space e. g. corresponding to the rate of climb or "descent" of an aerodyne.

In the alternative embodiment shown in Figs. 2 and 3, diaphragm-case 3 is supposed to be operatively connected with any movable element for effecting any suitable controlling operation, such as pressurization.

In the example shown in Fig. 1, the variation of the capacity of vessel 1 is obtained by means of a piston 6 provided with packing rings 7, said piston which is operable from outside by means of a rod 8, can be located in any selected position by means of a set-screw 9. An indicator 20 fast with rod 8 indicates on a scale 21 the position of piston 6.

In the embodiment shown in Fig. 2, the bottom of vessel 1 contains a liquid 10, the level of which can be varied by means of a piston 11 slidably mounted in a cylinder 12. A locating finger 13 which, in the example shown, is subjected to the action of a spring, permits holding piston 11 in any selected position by engagement of said finger 13 in one of the locating notches 14 provided, for this purpose, on the rod of the piston 11.

In the alternative embodiment shown in Fig. 3, the variation of the capacity of vessel 1 is obtained by means of bellows 15, the deformation of which can be adjusted by means of a control-rod 16 provided with a handle. Said rod is further provided with two locating notches 17, 18 cooperating with spring-fingers 19.

In the case of Figs. 1 and 2, the amplitude of the volume variation may be selected according to the expected rate of variation of the external pressure. In the case of Fig. 3, said rate of variation has been assumed to be constant and, with the arrangement shown, it is possible to increase or decrease the capacity of vessel 1 by a predetermined extent.

The movable control means of the variometer are so adjusted, as to give the possibility to the operator using the said control means to reduce considerably the transient period which appears in these types of variometers between the beginning of the variation of the outer pressure and the time when the variometer gives a steady indication.

The variometer according to the invention operates as follows:

As already mentioned, the operator is supposed to know at least approximately the rate of pressure variation to which the variometer is to be subjected. According as to whether this variation is to be positive or negative, he has only to depress or compress, immediately before the beginning of these expected variations, the inner space of vessel 1 by acting in the relevant direction upon the hand-control actuating the capacity-varying means. If said hand-control is provided with an indicator such as 20 in Fig. 1, the operator will bring said indicator on a graduation corresponding to the expected rate of variation, whereupon he will fix the movable member, e. g. by means of screw 9. In the embodiments shown in Figs. 2, and 3, said location takes place automatically. It is also possible, within the scope of the invention, to provide two graduated scales for climb and descent respectively or a differential scale to avoid re-setting between two successive operations.

It is to be understood that the invention is not limited to the examples described and shown and that it may be effected with numerous modifications within the reach of those skilled in the art without departing from the spirit of the invention.

What I claim is:

1. A variometer comprising, in combination, a closed vessel, a capillary tube connecting said closed vessel with an outer space to vary the pressure in said vessel in response to pressure variations in said outer space with a pressure difference with respect thereto, a device responsive to said pressure difference, said device having an element exposed to the pressure in said vessel and an element exposed to the pressure in said outer space, an index operatively connected with said pressure difference responsive device to detect the value of said pressure difference and hence the rate of variation of said outer space pressure, a cylindrical chamber adapted to form part of said vessel, movable control means within said chamber to vary the capacity of said vessel, locating means to hold said movable control means stationary when they are not operated, and indicator means to indicate the located position of said movable control means, whereby the initial pressure in said vessel can be brought before use to a predetermined value capable of reducing to a minimum the time required for building-up said pressure difference.

2. A variometer as claimed in claim 1, wherein said pressure difference responsive device is constituted by an aneroid diaphragm case having its inner space permanently communicating with said vessel and its outer wall exposed to the pressure in said outer space.

3. A variometer as claimed in claim 1, in which said movable control means is a piston and piston rod and said locating means comprises a set screw adapted to clamp said piston rod at will in any desired position.

References Cited in the file of this patent

UNITED STATES PATENTS

| | | |
|---|---|---|
| 2,142,338 | Sidwell | Jan. 31, 1939 |
| 2,159,703 | Koch | May 23, 1939 |
| 2,445,335 | Philbrick et al. | July 20, 1948 |
| 2,632,374 | Klemperer | Mar. 24, 1953 |

FOREIGN PATENTS

| | | |
|---|---|---|
| 615,601 | Germany | July 18, 1935 |